United States Patent [19]
Guzikowski

[11] Patent Number: 5,529,481
[45] Date of Patent: Jun. 25, 1996

[54] ROTATIONAL MOLD HAVING A DIVIDER RING BETWEEN FACING EDGES OF TWO SEPARABLE MOLD SHELLS

[75] Inventor: Gary R. Guzikowski, Franklin, Wis.

[73] Assignee: The Kelch Corporation, Mequon, Wis.

[21] Appl. No.: 385,627

[22] Filed: Feb. 9, 1995

[51] Int. Cl.⁶ .................................................. B29C 41/04
[52] U.S. Cl. ............................................ 425/434; 425/435
[58] Field of Search ............................... 425/434, 435, 425/425

[56] References Cited

U.S. PATENT DOCUMENTS

| 3,528,133 | 9/1970 | Morse | 425/435 |
| 3,865,534 | 2/1975 | Mori | 425/435 |
| 4,716,003 | 12/1987 | Gaudreau | 425/435 |
| 5,094,607 | 3/1992 | Masters | 425/435 |
| 5,306,564 | 4/1994 | Guzikowski | 425/408 |

FOREIGN PATENT DOCUMENTS

| 2203297 | 7/1973 | Germany | 425/434 |
| 63-301752 | 12/1988 | Japan | 425/434 |

Primary Examiner—Robert Davis
Attorney, Agent, or Firm—Quarles & Brady

[57] ABSTRACT

A mold is disclosed for producing two unjoined molded items in a single void during a single molding process. A divider ring is provided along the joining seam between mold halves. The ring has a central aperture and is formed of a stick resistant material.

9 Claims, 2 Drawing Sheets

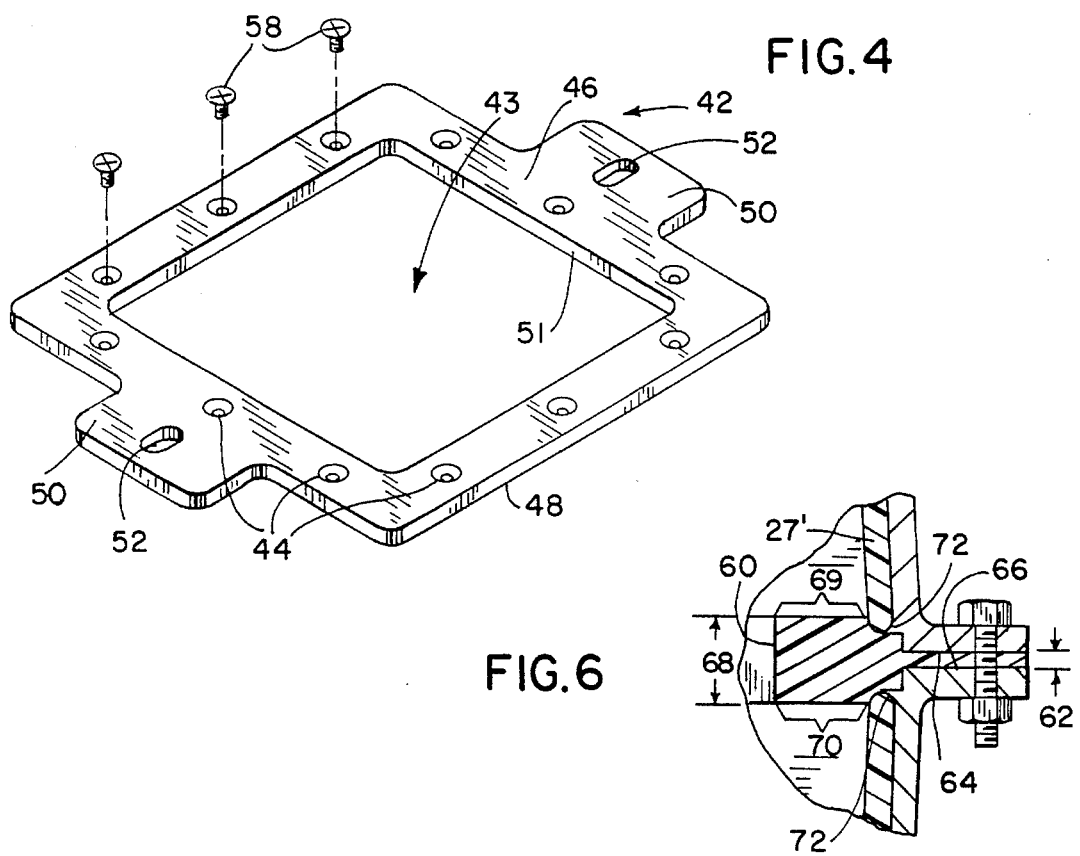
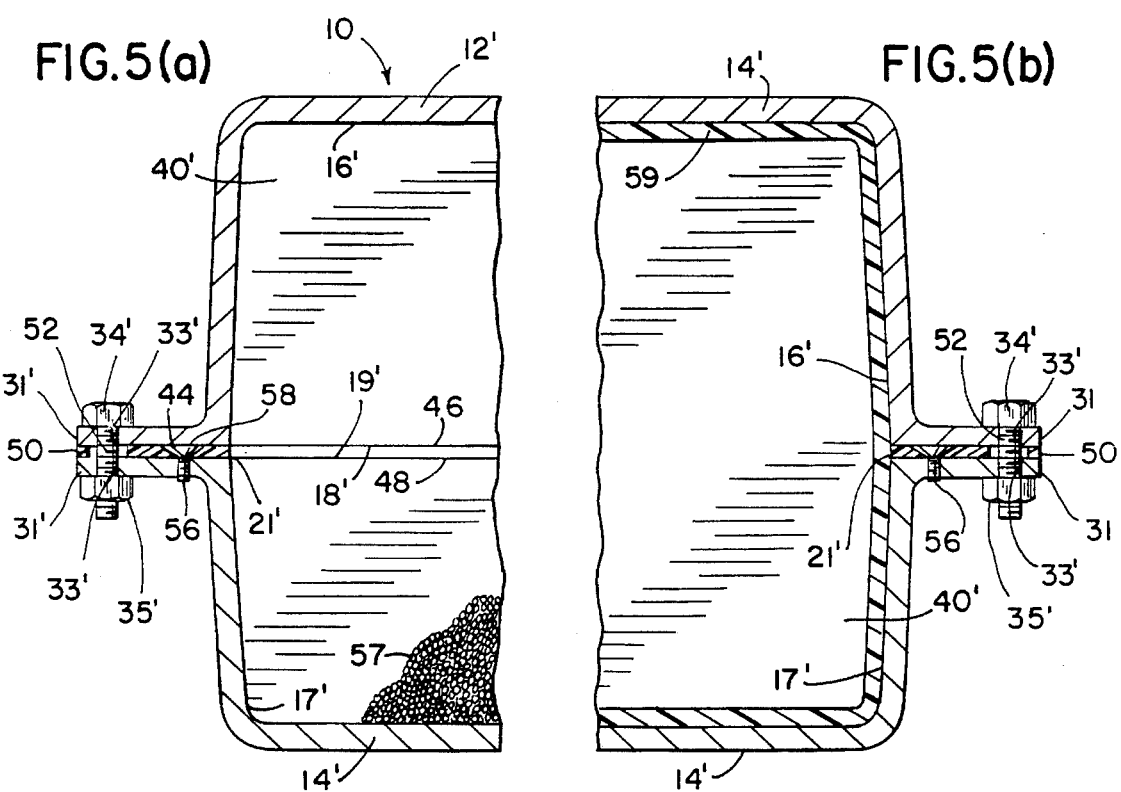

ROTATIONAL MOLD HAVING A DIVIDER RING BETWEEN FACING EDGES OF TWO SEPARABLE MOLD SHELLS

BACKGROUND OF THE INVENTION

1. Field of the Invention

This invention relates to molding devices, and particularly to an apparatus for molding two unjoined items during a single molding process in a single mold cavity.

2. Description of the Art

Rotational molding systems are well know. For example, U.S. Pat. No. 5,306,564 describes a mold wherein two metallic (aluminum) molding portions are brought together to form a mold cavity in which a single molded item is cast.

To form an item using such a mold, molding particulate (usually a plastic such as polyethylene) is placed inside the cavity, the mold is closed, the mold is placed in a furnace where it is heated (or is otherwise heated), and the mold is rotated. The particulate melts and sticks to the internal surface of the is cavity. After a plurality of rotations, the entire internal surface of the mold is coated with the melted particulate. After cooling the mold is opened and the molded item is removed.

Unfortunately, melted plastic often seeps into the seam between the mold halves. As a result, there is an imperfectly formed article. This excess material is usually trimmed from the final product and discarded after the molding process. Trimming is labor intensive and can be wasteful. Also, the presence of such material can sometimes make it more difficult to open the mold.

Moreover, if multiple items are desired from a single casting, the molded item must be cut in two (usually along the seam line formed at the sealing edges of the two mold halves). This requires a cutting step and a cutting system, and can impose limitations on the shape of the items being formed.

It would therefore be advantageous to have a rotational mold that inhibits material from leaking out of a mold seam and permits two unjoined items to be directly formed in the mold cavity.

SUMMARY OF THE INVENTION

The invention provides a rotational mold for simultaneously forming two unjoined items from a molding material. The mold has two separable mold shells, each of which has an internal cavity for forming one of the items and a facing edge. There is also a divider ring positionable between the facing edges when the mold is closed (so as to be sandwiched thereby). The divider ring has an aperture therethrough suitable to permit the molding material to pass between the two internal cavities when the mold is first closed. The divider ring also inhibits the formed items from becoming fused together during molding. To achieve this, at least a radially inward wall of the divider ring is made of a stick resistant material (e.g. Teflon).

In a preferred form, when the shells and divider ring are sandwiched together the divider ring extends radially inwardly into, and thus divides, a mold void defined by the two cavities and a space between them. The divider ring is thick (e.g. ½ or more), and the aperture through it is inwardly positioned a substantial distance away from the mold shell walls. Alternatively the ring can be so thin so as to be compressible (e.g. about ⅛), and can be essentially flush with adjacent internal surfaces of the mold shells.

In another form of the invention there are provided two separable mold shells, each of which has an internal cavity and a facing edge. Also provided is a gasket positionable between the facing edges when the mold is closed so as to be sandwiched thereby. The gasket has a central aperture and is made of a stick resistant fluorocarbon.

In yet another form of the invention, a fluorocarbon gasket of the above type is separately provided.

The objects of the invention therefore include providing a mold and/or divider of the above kind that:

a) allow for two unjoined molded items to be produced in a single void during a single molding process;

b) are low cost; and c) reduce the need for trimming products after a molding process. The foregoing and other objects and advantages of the invention will appear from the following description. In the description below, reference is made to the accompanying drawings which form a part hereof, and in which there is shown by way of illustration preferred embodiments of the invention. Such embodiments do not necessarily represent the full scope of the invention. Reference is therefore made to the claims herein for interpreting the full scope of the invention.

BRIEF DESCRIPTION OF THE DRAWINGS

FIG. 4 is a perspective view of a second gasket of the present invention;

FIG. 5(a) is a cross-sectional view similar to FIG. 3(a), albeit with the gasket of FIG. 4;

FIG. 5(b) is a view similar in FIG. 5(a), albeit after the molding process; and

FIG. 6 is an enlarged partial cross-sectional view of a third embodiment of the present invention.

DESCRIPTION OF THE PREFERRED EMBODIMENT

Figure 1:
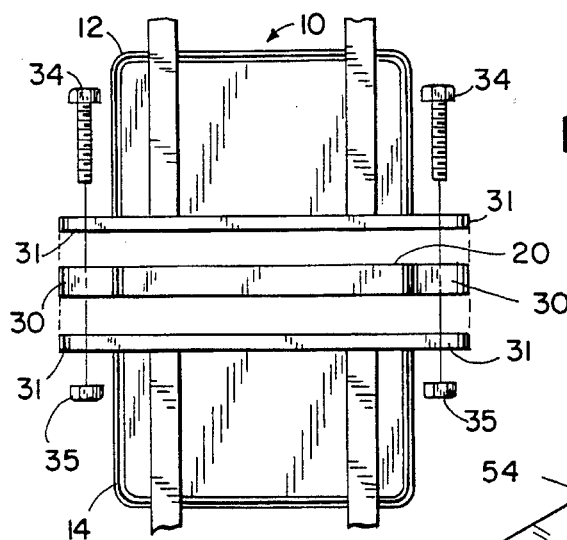
FIG. 1 is a front elevational (exploded) view of a rotational mold embodying the present invention.
Figure 2:
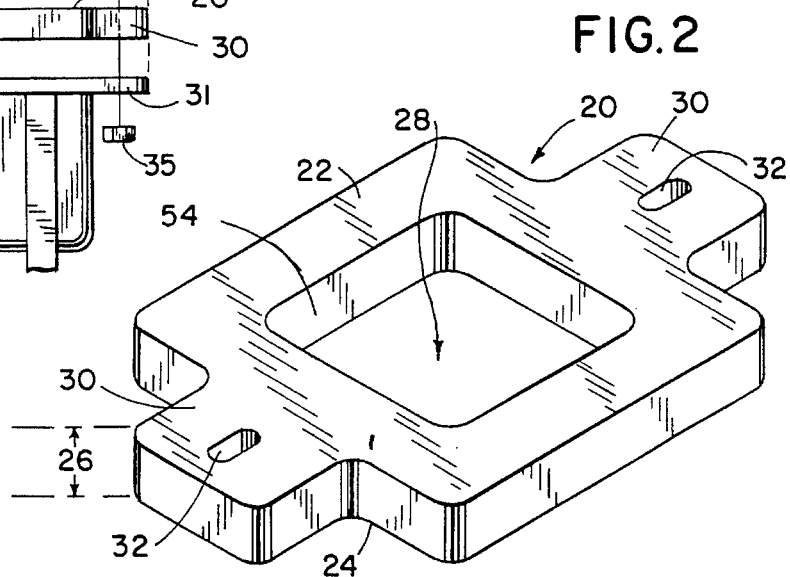
FIG. 2 is a perspective view of a first embodiment of a gasket according to the present invention.

A rotational mold (generally 10) includes upper and lower metallic thermally conductive mold halves (shells) 12, 14. The halves 12, 14 define internal chamber surfaces 16, 17 and also have "facing" edges 18, 19. An opening edge 21 is formed on each half 12, 14 by the intersection of an internal chamber surface 16, 17 and an associated facing surface 18, 19. When closed, the two mold halves 12, 14 form a void 40 defined by the chambers and the space therebetween.

A clamping mechanism is used to secure the halves 12, 14 in the closed position. Each mold half 12, 14 includes a flange 31 extending radially. Each flange 31 includes at least two holes 33 positioned on opposite sides of a corresponding mold shell 12, 14. The holes of halves 12, 14 align when the halves 12, 14 are brought together. There are a plurality of bolts 34 and nuts 35, one bolt 34 extending through each pair of aligned holes 33 and tightened into a corresponding nut 35. As will be readily appreciated, other securing mechanisms could instead be used to secure the two halves 12, 14 together.

The present invention also includes a divider/gasket 20 having upper and lower oppositely facing surfaces 22, 24, a vertical thickness 26, and a centrally located aperture 28 defined by a radially inward aperture wall 54. In the FIG. 3(a) embodiment, aperture 28 is smaller in area than the area defined by the opening edges 21.

When the divider ring 20 is sandwiched between the upper and lower mold halves 12, 14, upper and lower shelves 36, 38 are created around the void 40 between the opening edges 21 and the aperture wall 54. Each shelf 36, 38 provides a surface extending inwardly from the opening edges about one inch. When using typical plastic molding materials, the gasket width 26 is preferably greater than one-half of an inch. Most preferably, the width 26 is three-fourth of an inch.

The gasket 20 also includes radially extending anchors 30. Holes 32 are provided in each anchor 30 that align with the holes 33 in the flanges 31 when the gasket 20 is sandwiched between the halves 12, 14.

In accordance with the present invention, the gasket 20 is formed of a stick resistant material such as a fluorocarbon. In an especially preferred embodiment the fluorocarbon is polytetrafluorethylene (e.g. Teflon®). By "stick resistant", I mean resistant to sticking to melted polyethylene.

Figure 3A:
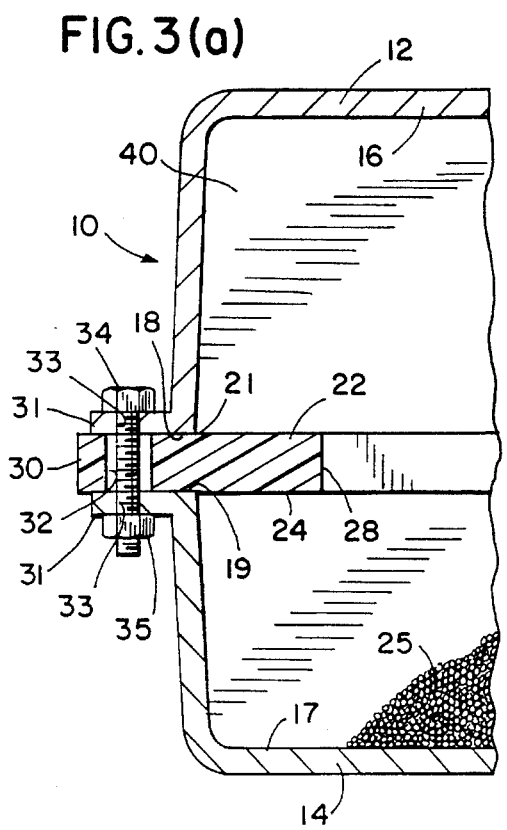
FIG. 3(a) is a partial cross-sectional view of the mold shown in FIG. 1, immediately after the mold is closed (prior to molding)

Referring still to FIG. 3(a), prior to closing the mold, molding particulate 25 is positioned within the mold. In Fig. 3(a), a pile of molding particulate 25 is shown prior to heating. The gasket 20 is positioned with its lower surface 24 contacting the surface 19. The upper mold half 12 is placed on top of the gasket 20, with its surface 18 contacting upper surface 22. When so positioned, the mold halves 12, 14 and gasket 20 together form the void 40. Anchoring bolts 34 are placed through holes 32 and 33 and fasten by nuts 35 to secure the gasket 20 in the sandwiched position between the upper and lower mold halves 12, 14.

To create two unjoined cast articles, the mold halves 12, 14 are rotated and heated until the molding particulate 25 that is proximate to the internal chamber surface 17 melts and forms a pasty liquid. In a liquid state, the molding material is characterized by a high viscosity and thus adheres to the chamber surfaces while the unmelted particles are free to move within the void 40. After a series of rotations, the internal surfaces 16, 17 are coated with melted molding material.

As the gasket 20 is formed of a stick resistant material, neither the melted material nor the unmelted particles 25 adhere to the gasket 20. Thus, after a plurality of rotations, while both internal walls 16, 17 become coated with melted material, shelves 36, 38 and wall 54 do not. The gasket shelves 36, 38 instead surprisingly form a barrier between the two halves 12, 14 separating the molding material into two cast items, one in the first mold half 12 and a second in the second mold half 14. Instead of the possibly expected hourglass shaped single object, one surprisingly creates two separate objectsp!

Figure 3B:
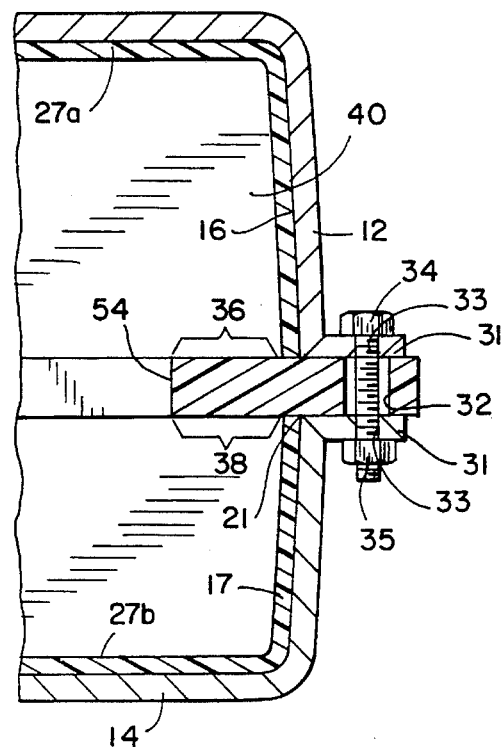
FIG. 3(b) is a view similar to FIG. 3(a), albeit after the molding process.

Referring now to FIG. 3(b), after the entire surface area of each internal wall 16, 17 is covered with melted material, the mold halves 12, 14 are allowed to cool and the molding material therein hardens into two separate and solid molded items 27a, 27b. When the mold 10 is opened (after removing the gasket 20), both cast items 27 can be removed and the mold 10 and gasket 20 can be reused.

In addition to providing two molded products without requiring a cutting step (or as an alternative function), the present invention can reduce material leakage along the seam. For the anti-leakage function alone, the gasket 42 (FIG. 4) preferably has width of approximately ⅛" or less) so that it slightly compresses to form an even better seal. This embodiment includes upper and lower oppositely facing surfaces 46, 48 and oppositely extending anchor portions 50 forming anchoring holes 52. In addition, this embodiment includes a plurality of screw holes 44 spaced around an aperture 43.

In the FIG. 5(a) embodiment the wall 51 defining the aperture 43 can precisely follow the contour of the opening edges 21' defined by the intersection of associated sealing surfaces 18', 19' and internal surfaces 16', 17', respectively. With this embodiment, the aperture wall 51 forms a portion of the surface of a finished molded product. When the aperture wall 51 is flush with the internal walls 16', 17', it does not form shelves extending radially inwardly therefrom.

Note that the sealing surface of one of the mold halves 12', 14' includes screw bores 56 that align with the screw holes 44 when the gasket 42 is located in an operational position. To install the gasket 42, the gasket 42 is positioned with its lower surface 48 contacting sealing surface 19'. A plurality of flat head, counter sunk screws 58 are placed through holes 44 and into screw bores 56 to hold the gasket 42 on the sealing surface 19'. Molding particulate 57 is then positioned within the lower mold half 14', and the upper mold half 12' is placed on top of the gasket 42, with its sealing surface 18' contacting the upper surface 46 of the gasket 42. As in FIG. 3(a), in FIG. 5(a) a pile of unmelted particulate 57 is shown in void 40'. Anchoring bolts 34' are placed through holes 33' in the upper half 12" through flanges 31' through holes 52, and through holes 33' in the lower mold half 14', each bolt 34' being secured by a nut 35' therebelow.

Prior to heating the mold halves 12', 14' the anchoring bolts 34' are tightened. The aperture wall 51 is then flush with both internal chamber surfaces 16', 17'.

To create a cast article, the mold halves 12', 14' are heated forming a pasty molten material and the mold 10' is rotated about various axes thus providing unmelted molding particulate 57 to all internal chamber surfaces 16', 17'. After a series of rotations, all of the internal surface area is coated with melted molding material.

This is because the gasket 42 has a relatively narrow width and doesn't project into the mold during rotation. As a result, the melted material still is able to bridge the gap formed by the gasket 42 between the mold halves 12', 14'. After the entire internal surface of the void 40 is covered with melted material, the mold halves 12, 14 are allowed to cool and the molding material therein hardens into a solid, single cast 59.

Surprisingly, seams at the joint between the upper and lower surfaces of the gasket 42 and the sealing surfaces 18', 19' are now minimal. This is in part because the non-stick material inhibits molten plastic from adhering adjacent the joint.

Although preferred embodiments of the invention have been described above, the invention claimed is not so restricted. For example, referring to FIG. 6, gasket 60 could have two different widths, a lesser width 62 forming an anchor member sandwiched between sealing surfaces 64, 66 for securing purposes, and a greater width 68 forming upper and lower shelves 69, 70. In addition, while approximately right angle shelves 36, 38 are shown in FIG. 3, the gasket may form angled shelves, each shelf 36 or 38 making an angle greater than 90° with an adjacent internal surface 16 or 17.

Moreover, while the facing surfaces are usually shown forming right angles with cavity walls, if it is desirable to form cast products having rounded edges near the seam, referring to FIG. 6, each sealing surface 64, 66 might be constructed so as to form a radially inwardly extending lip 72.

Moreover, the void can be divided by more than one divider (e.g. to create three parts). Also, numerous types of items can be created using the mold (e.g. tanks; sand boxes; cups; jugs). Thus, the invention is not limited by the specific description above. Rather, it should be judged by the claims which follow.

I claim:

1. A rotational mold for simultaneously forming two unjoined items from a molding material, the mold comprising:

two separable mold shells, each of which having an internal cavity for forming one of the items and a facing edge; and a divider ring having a lesser width portion positionable between the facing edges when the mold is closed to be sandwiched thereby, and a greater width portion circumscribed by the lesser width portion, the greater width portion having an aperture therethrough suitable to permit said mold material to pass between the two internal cavities when the mold is first closed if the molding material is in the mold while preventing the items from becoming fused together during molding.

2. The mold of claim 1, wherein at least a radially inward wall of the divider ring is made of a stick resistant material.

3. The mold of claim 1, wherein the divider ring is made of a stick resistant fluorocarbon.

4. The mold of claim 3, wherein the fluorocarbon is a plytetrafluoroethylene.

5. The mold of claim 1, wherein the shells and divider ring are positionable such that when sandwiched together when the mold is closed the greater width portion extends radially inwardly into, and divides, a mold void defined by the two cavities and a space between them.

6. The mold of claim 5, wherein the aperture is no closer then ½" to a mold shell along the greater width portion when the mold is closed.

7. The mold of claim 6, wherein the aperture is no closer than 1" to a mold shell along the greater width portion when the mold is closed.

8. The mold claim 1, wherein the greater width portion is at least ½ inch thick.

9. A rotational mold for producing a single item from molding material, the mold comprising:

two separable mold shells, each of which having an internal cavity for forming said single item and a facing edge; and a divider ring positionable between the facing edges when the mold is closed to be sandwiched thereby, the divider ring have a aperture therethrough suitable to permit the mold material to pass between the two internal cavities when the mold is first closed if the molding material is in the mold, the divider having a radially inward wall made of stick resistant material and essentially flush with both adjacent internal surfaces of the mold shells when the divider ring is sandwiched between the shells.

\* \* \* \* \*

UNITED STATES PATENT AND TRADEMARK OFFICE
CERTIFICATE OF CORRECTION

PATENT NO. : 5,529,481  Page 1 of 2
DATED : June 25, 1996
INVENTOR(S) : Gary R. Guzikowski It is certified that error appears in the above-indentified patent and that said Letters Patent is hereby corrected as shown below:

| | |
|---|---|
| Column 1, line 19 | delete the word "is" immediately before "cavity" |
| Column 1, line 38 | replace [directly] with "*directly*" |
| Column 1, line 57 | replace [1/2] with " 1/2" " |
| Column 1, line 60 | replace [1/8] with " 1/8" " |
| Column 3, line 51 | replace [not] with "*not*" |
| Column 3, line 57 | replace [separate objectsp!] with "*separate* objects!" |
| Column 4, line 32 | replace [12"] with "12'" |
| Column 4, line 35 | replace [anchoring ,] with "anchoring" |

UNITED STATES PATENT AND TRADEMARK OFFICE
CERTIFICATE OF CORRECTION

PATENT NO. : 5,529,481

DATED : June 25, 1996

INVENTOR(S) : Gary R. Guzikowski

It is certified that error appears in the above-indentified patent and that said Letters Patent is hereby corrected as shown below:

Column 6, claim 4, line 2, replace [plytetrafluoroethylene] with "polytetrafluoroethylene"

Signed and Sealed this

Fifteenth Day of October, 1996

Attest:

BRUCE LEHMAN

Attesting Officer

Commissioner of Patents and Trademarks